United States Patent [19]

Ochsner

[11] 4,028,461
[45] June 7, 1977

[54] METHOD OF MAKING A PLURALITY OF SUBSTANTIALLY IDENTICAL FLEXIBLE DIAPHRAGMS

[75] Inventor: Rolf H. Ochsner, Trumbull, Conn.

[73] Assignee: Robertshaw Controls Company, Richmond, Va.

[22] Filed: Sept. 5, 1975

[21] Appl. No.: 610,664

[52] U.S. Cl. .............................. 264/297; 264/286; 264/320; 264/322
[51] Int. Cl.² .......................................... B29D 9/00
[58] Field of Search ....................... 92/103 SD, 104; 264/286, 320, 322, 297, 292, 293

[56] References Cited
UNITED STATES PATENTS

| | | | |
|---|---|---|---|
| 3,131,565 | 5/1964 | Amlie | 92/103 SD |
| 3,293,349 | 12/1966 | Diebold | 92/104 |
| 3,546,221 | 12/1970 | Johnson | 264/322 X |
| 3,661,060 | 5/1972 | Bowen | 92/103 SD |
| 3,751,328 | 8/1973 | Roberts | 264/286 X |

OTHER PUBLICATIONS
T941,018, Dec. 1975, Clarke, 264/320 X.

*Primary Examiner*—Richard R. Kucia
*Attorney, Agent, or Firm*—Candor, Candor & Tassone

[57] ABSTRACT

A method of making a plurality of substantially identical flexible diaphragms for control devices comprising the steps of providing a plurality of sheets of polyester film each being approximately 0.0005 to 0.0010 of an inch thick and each being a circular disc approximately 4½ inches in diameter and forming the diaphragms from the sheets so that each diaphragm has an annular corrugation formed therein concentric with the center thereof and inboard of the outer periphery thereof, the step of forming the diaphragms comprising the steps of disposing the sheets in stacked aligned relation in a mold and compressing and heating the sheets in the mold in the stacked aligned relation thereof to substantially simultaneously heat form the corrugations in the sheets to thereby make the diaphragms substantially identical to each other.

2 Claims, 4 Drawing Figures

4,028,461

METHOD OF MAKING A PLURALITY OF SUBSTANTIALLY IDENTICAL FLEXIBLE DIAPHRAGMS

This invention relates to a method of making a plurality of substantially identical flexible diaphragms for control devices or the like.

It was found that a diaphragm was needed with extremely low spring rate, or high flexibility, having low mass and being able to withstand relatively high pressures without damage. Such a diaphragm was required to operate over a pressure range of 0.01 to 1.0 inches w.c. and withstand pressures to 2 psig.

Accordingly, it is a feature of this invention to provide such a flexible diaphragm.

In particular, one embodiment of this invention provides a flexible diaphragm for a control device or the like formed from a sheet of polyester film approximately 0.0005 to 0.0010 of an inch thick. Such flexible diaphragm of this invention can be formed with an annular corrugation or flute therein to obtain linear and repeatable characteristics as the corrugation thereof eliminates wrinkling (oil canning).

In the method of this invention, it was found that in the corrugated form of diaphragm, the corrugation can be heat set into a flat blank of film when heated by a metal form, mechanically loaded by a silicone rubber mating mold.

It was also found according to the teachings of this invention, that more than one diaphragm can be so formed by disposing a plurality of flat film blanks in stacked relation in the die forming apparatus. If desired, a suitable release compound can be utilized between the blanks for ease of separation of the subsequently formed diaphragms.

Accordingly, it is an object of this invention to provide a method of making a plurality of substantially identical flexible diaphragms, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

Figure 1:
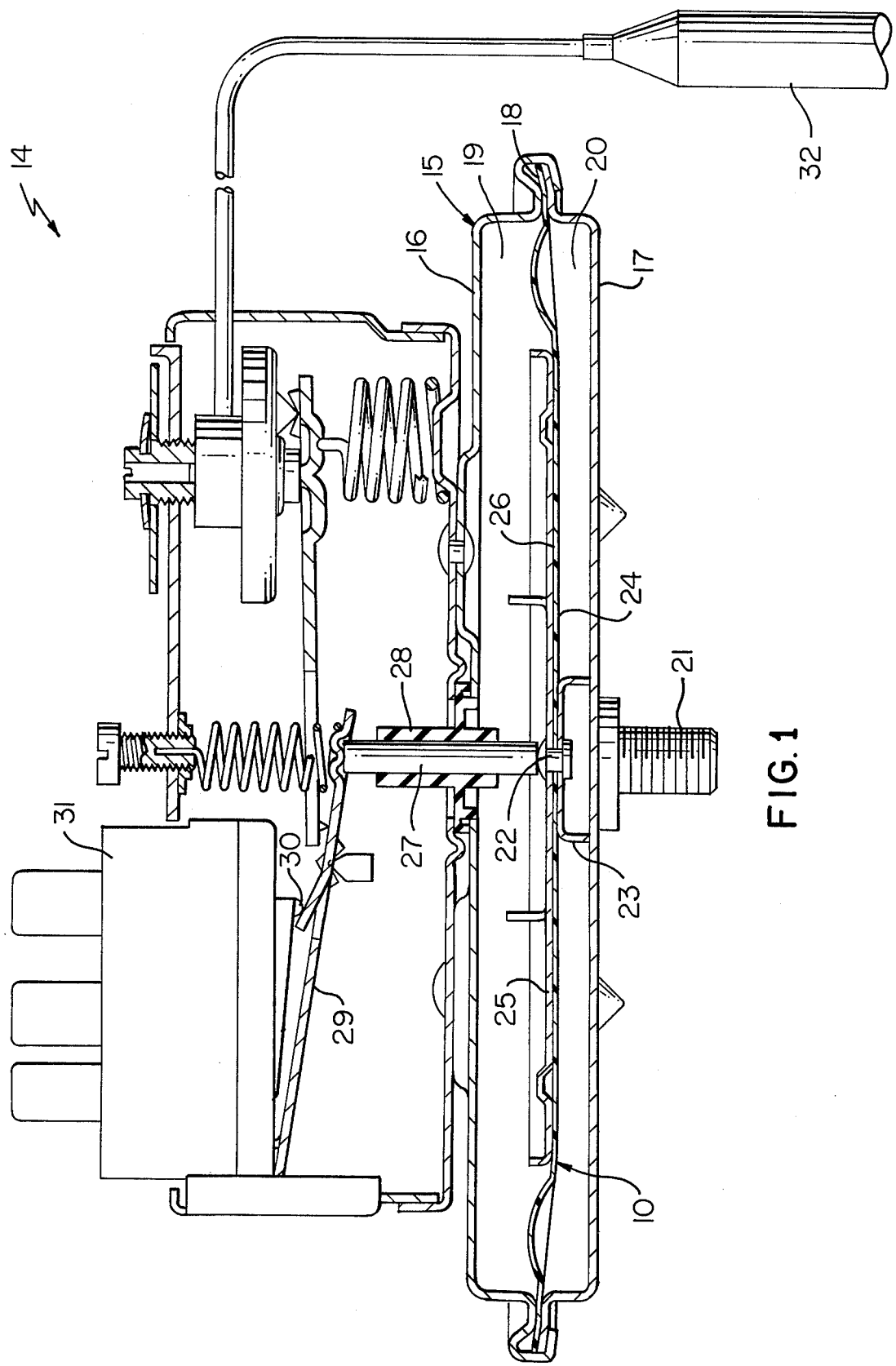
FIG. 1 is a cross-sectional view of a typical control device utilizing the improved flexible diaphragm of this invention.

While the various features of this invention are hereinafter described and illustrated as being particularly adapted to provide a flexible diaphragm for a particular control device, it is to be understood that the various features of this invention can be utilized singly or in any combination thereof to provide a flexible diaphragm for other types of control devices as desired.

Therefore, this invention is not to be limited to only the embodiment illustrated in the drawings, because the drawings are merely utilized to illustrate one of the wide variety of uses of this invention.

Figure 2:
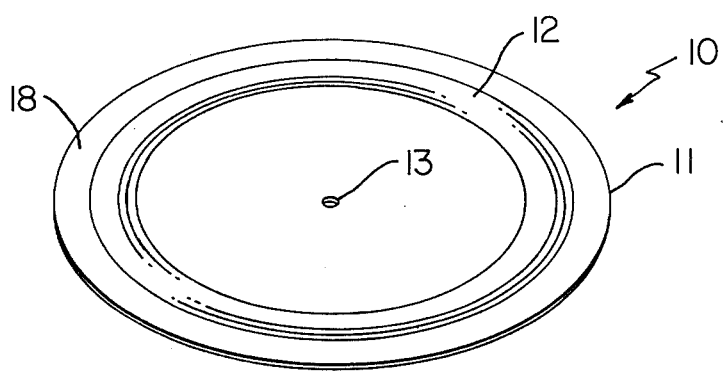
FIG. 2 is a reduced perspective view of the improved diaphragm of this invention.

Referring now to FIG. 2, the improved flexible diaphragm of this invention is generally indicated by the reference numeral 10 and comprises a sheet of polyester film 11 formed into a substantially circular disc and, if desired, can have an annular flute or corrugation 12 formed therein in a manner hereinafter described to eliminate wrinkling (oil canning) thereof in order to obtain linear and repeatable characteristics as previously described.

The circular disc 11 can be die cut as a flat blank from a larger polyester film sheet of approximately 0.0005 to 0.0010 of an inch thick and in the preferred embodiment of this invention, a polyester film of approximately 0.00075 of an inch was utilized.

During the blanking operation of the circular disc 11 or subsequent thereto, a central opening 13 can be formed in the flexible diaphragm 10 so that the same can accommodate a diaphragm button in a manner well known in the art.

For example, the flexible diaphragm 10 of this invention can be utilized in a control device that is generally indicated by the reference numeral 14 in FIG. 1 and comprises a control device that is fully disclosed and claimed in the copending patent application Ser. No. 565,615, filed Apr. 7, 1975.

Therefore, should a person desire information on the details of the structure and operation of the control device 14, reference can be made to such copending patent application as it will only be necessary to describe certain parts of the control device 14 in this application in order to fully understand the operation of the flexible diaphragm 10 of this invention.

In particular, the control device 14 comprises a housing means 15 formed of two parts 16 and 17 trapping the outer peripheral portion 18 of the flexible diaphragm 10 therebetween so that the flexible diaphragm 10 divides the housing means 15 into two chambers 19 and 20, the chamber 20 being adapted to be interconnected to a pressure source by a nipple means 21.

A diaphragm button 22 passing through the central opening 13 of the diaphragm 10 can fasten a backing member 23 to one side 24 of the diaphragm 10 and a larger plate 25 to the other side 26 of the diaphragm 10 with the diaphragm button 22 being engageable with a plunger 27 carried for axial movement in a bearing 28 of the housing means 15, the plunger 27 operating a lever 29 pivotally carried by the housing means 15. The lever 29, in turn, operates a plunger arrangement 30 of an electrical switch 31 carried by the housing means 15 whereby up and downward movement of the diaphragm 10, depending upon the pressure differential acting across the same, will cause the switch 31 to open and close depending upon the temperature being sensed by a temperature sensing bulb 32.

Thus, it was found that the diaphragm 10 of this invention, when utilized in the control device 14 of FIG. 1, must operate over a pressure range of 0.01 to 1.0 inch w.c. and withstand pressures of over 2 psig while having an extremely low spring rate or high flexibility, a low mass and be able to withstand relatively high pressures without damage.

By forming the flexible diaphragm 10 of this invention from the polyester film of 0.0005 to 0.0010 inch thick in a manner hereinafter described, such a diaphragm 10 of approximately 4½ inches in diameter permitted performance below 0.1 inch w.c. and repeat characteristics within 0.005 inch w.c.

Figure 3:
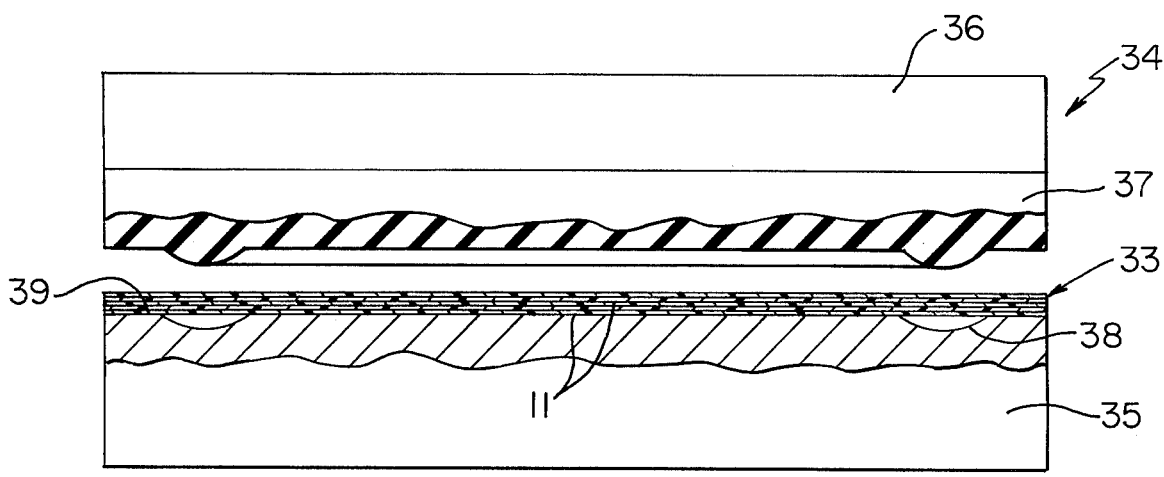
FIG. 3 illustrates the die forming apparatus of this invention for forming the flexible diaphragm of FIG. 2.

In particular, a polyester film of approximately 0.00075 of an inch was utilized and a plurality of circular blanks 11 were cut from one or more sheets thereof. The plurality of such circular flat blanks 11 were disposed in stacked aligned relation as represented by the reference numeral 33 in FIG. 3 and were placed in a die apparatus that is generally indicated by the reference numeral 34 in FIGS. 3 and 4, the apparatus 34 comprising a lower heated metal die member 35 and an upper die member 36 having a silicone rubber molding face 37. The lower die member 35 has an annular groove 38 in the upper face 39 thereof whereby when the upper die member 36 is moved downwardly to compress the stack 33 of flat circular blanks 11 therebetween, the molding face 37 of the upper die 36 forces part of the blanks 11 into the annular groove 38 of the lower die member 35 as illustrated in FIG. 4 whereby the annular corrugations or flutes 12 of the flexible diaphragm 10 of this invention are heat set into the flat blanks 11 for the purpose previously described.

Figure 4:
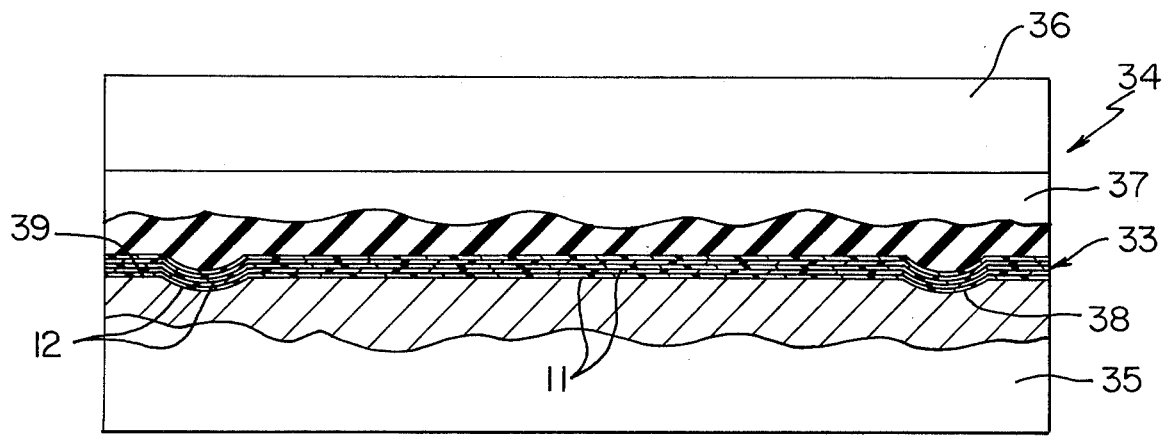
FIG. 4 is a view similar to FIG. 3 and illustrates another step in the die forming operation of this invention.

After the annular flutes or corrugations 12 have been formed in the diaphragms 10 by the die apparatus 34 in the manner illustrated in FIG. 4, the die members 35 and 36 are separated and the thus formed diaphragms 10 can be separated from each other and utilized in the manner previously described.

It has been found that up to five diaphragms 10 can be formed by the die apparatus 34 of this invention but it may be desired to utilize a conventional release compound between the blanks 11 before the same are formed by the apparatus 34 in order to provide for ease of separation of the subsequently formed flexible diaphragms 10 of this invention.

Therefore, it can be seen that this invention provides a method of making a plurality of substantially identical flexible diaphragms for control devices or the like.

While the method of this invention now preferred has been illustrated and described as required by the Patent Statute, it is to be understood that other method steps can be utilized and still fall within the scope of the appended claims.

I claim:

1. A method of making a plurality of substantially identical flexible diaphragms for control devices or the like comprising the steps of providing a plurality of sheets of polyester film each being approximately 0.0005 to 0.0010 of an inch thick and each being a circular disc approximately four and one-half inches in diameter, and forming said diaphragms from said sheets so that each diaphragm has an annular corrugation formed therein concentric with the center thereof and inboard of the outer periphery thereof, said step of forming said diaphragms comprising the steps of disposing said sheets in stacked aligned relation in a mold, and compressing and heating said sheets in said mold in said stacked aligned relation to substantially simultaneously heat form said corrugations in said sheets to thereby make said diaphragms substantially identical to each other.

2. A method as set forth in claim 1 wherein said film is approximately 0.00075 of an inch thick.

* * * * *